United States Patent [19]

Willi et al.

[11] Patent Number: 5,524,904
[45] Date of Patent: Jun. 11, 1996

[54] LIP SEAL FOR ANTILOCK BRAKING SYSTEM ISOLATION VALVE AND SIMILAR VALVES

[75] Inventors: Gary A. Willi, Ann Arbor; Joseph A. Starr, Plymouth; William Doyle, Chelsea; Gary Knight, Woodhaven, all of Mich.

[73] Assignee: Kelsey-Hayes Company, Livonia, Mich.

[21] Appl. No.: 337,548

[22] Filed: Nov. 10, 1994

[51] Int. Cl.⁶ .................................................. F16J 15/32
[52] U.S. Cl. .............................. 277/152; 277/29; 277/70; 277/205
[58] Field of Search ........................... 277/152, 212 C, 277/205, 206 R, 206 A, 212 R, 29, 70, 215, 27

[56] References Cited

U.S. PATENT DOCUMENTS

| | | | |
|---|---|---|---|
| 3,271,038 | 9/1966 | Bastow | 277/205 |
| 4,828,335 | 5/1989 | Fuller et al. | 303/100 |
| 5,127,661 | 7/1992 | Franson et al. | 277/152 |
| 5,246,237 | 9/1993 | Gottling et al. | 277/205 |
| 5,328,178 | 7/1994 | Nies | 277/205 |

FOREIGN PATENT DOCUMENTS

| | | | |
|---|---|---|---|
| 62-49076 | 3/1987 | Japan | 277/152 |
| 1383322 | 2/1975 | United Kingdom | 277/205 |

OTHER PUBLICATIONS

Kelsey–Hayes Drawing 1985—1 page.
Kelsey–Hayes Drawing 1993—1 page.

*Primary Examiner*—Daniel G. DePumpo
*Attorney, Agent, or Firm*—Brooks & Kushman

[57] ABSTRACT

A lip seal having an annular body, a contiguous annular shoulder extending axially therefrom, and a contiguous annular seal lip extending coaxially from the body and flaring away from the shoulder. Strengthening ribs extend axially along the shoulder, the shoulder is undercut to provide space into which areas of the annular seal lip can escape, with each such feature thereby promoting nonuniform deformation of the annular seal lip, ensuring a path for fluid to flow, and thereby minimizing the possibility of a seal lock-up condition occurring when pressure is applied to the back of the lip seal during brake release. Flow ribs axially coextensive with the strengthening ribs also extend along the body to create fluid flow paths therebetween. The radial dimensions of the lip seal are also reduced to allow a valve cartridge of given diameter to function in a smaller housing bore than that required when a conventional lip seal is used, thus facilitating the downsizing of a control valve module in which the valve cartridge is to be used.

9 Claims, 3 Drawing Sheets

LIP SEAL FOR ANTILOCK BRAKING SYSTEM ISOLATION VALVE AND SIMILAR VALVES

TECHNICAL FIELD

This invention relates to hydraulic control valves for use particularly in vehicular antilock braking systems that may or may not be equipped with traction control and, in particular, to the design of the dynamic seals utilized in the control valves.

BACKGROUND ART

Reference is made to U.S. Pat. No. 4,828,335, assigned to the assignee of the present invention, illustrating a hydraulic control module for a vehicular antilock braking system, the subject matter of which is incorporated herein by reference. The module includes a number of solenoid-actuated hydraulic control valves generally serving the purpose either of isolating the flow of pressurized hydraulic fluid from the master cylinder to the brake cylinder or of dumping hydraulic fluid from the brake cylinder to an accumulator, which automatically supplies brake fluid at a pressure sufficient to reapply the brake at that particular cylinder to thereby assist in maintaining a controlled braking of the vehicle.

Each of these valves, namely the isolation valve and the dump valve, include an annular lip seal fitted within a valve cartridge and sealing it relative to a bore of a housing within which the valve cartridge is located, doing so in a manner that prescribes a fluid flow path through and around the valve to and from other hydraulic lines within the housing. Looking to the isolation valve, for example, the lip seal is located on the valve cartridge within the housing bore intermediate the valve inlet from the brake pedal and the valve outlet leading ultimately to a brake cylinder at the vehicle wheel.

The lip seal must function as (i) a check valve to preclude fluid flow between the valve and the housing bore from the inlet of the valve to the outlet of the valve, and (ii) as a flow valve or pressure relief valve for permitting flow of brake fluid from the brake cylinder and accumulator during brake release so that the normally open isolation valve is permitted to open in its conventional manner rather than be forced closed by the unrelieved pressure of the brake fluid from the brake cylinder.

Conventionally, for the purpose of providing a flow valve, as shown in U.S. Pat. No. 4,828,335, the outer extremities of the seal are provided with numerous axially extending and angularly equidistantly spaced ribs, with the passage between each pair of adjacent ribs defining a flow path for brake fluid to flow past the seal lip from the master cylinder side during brake release.

However, during conditions of extreme pedal pressure being applied to the brakes, this increased fluid pressure within the annular groove retaining the lip seal may force the lip seal to the low pressure side of the annular groove and place it under significant compression.

This can result in the valves experiencing a lock-up condition wherein the annular lip symmetrically deforms and is held fast to the valve bore with no space into which it can escape to allow fluid flow through the bore and resultant pressure release across the valve outlet to allow the isolation valve to open.

As a related matter, there has been great interest in downsizing the hydraulic control module, primarily for saving space and weight. If the radial cross-sectional area of the lip seal can be decreased, for example, if the inside diameter of the seal can be maintained while decreasing the outside diameter of the seal to accommodate a valve cartridge of given diameter within a smaller diameter bore, then the opportunity presents itself for downsizing an entire hydraulic control module.

SUMMARY OF THE INVENTION

An object of the present invention is to provide an improved lip seal configured to provide specifically defined fluid flow paths to accommodate flow during fluid pressure relief.

Another object of the present invention is to provide a lip seal having a configuration that deforms in a nonuniform but a relatively predetermined manner to ensure fluid flow during fluid pressure relief and to minimize the possibility of a lock-up condition occurring.

Yet another object of the present invention is to furnish a lip seal that provides space into which its lip can escape to ensure that fluid has a flow path during fluid pressure relief.

A feature of the present invention is to provide a lip seal having radial dimensions that minimize the cross-sectional area thereof to allow a valve cartridge of conventional diameter to function within a valve housing bore of reduced diameter, thereby providing means for downsizing hydraulic control modules of which the housing defining the bore is a component.

In realizing the aforementioned and other objects and features, the present invention includes a lip seal having a first end, a second end and a central axis along which it extends. It has a resilient annular body proximate the first end and a resilient annular shoulder extending from the annular body to the second end. A resilient annular lip axially coextends from the body proximate the first end and flares outwardly toward the second end.

A plurality of resilient flow ribs extend axially along an outer surface of the body proximate the first end to slidably contact an internal bore surface of a valve body in which it finds application. Each adjacent pair of the plurality of flow ribs defines a fluid flow path therebetween.

A plurality of resilient strengthening ribs extend axially along an outer surface of the shoulder proximate the second end, increasing the radial cross-sectional area of the shoulder and thereby reinforcing the shoulder.

The shoulder is undercut between the strengthening ribs to provide space into which areas of the annular lip can escape. This promotes the nonuniform deformation of the annular lip, which ensures a path for fluid to flow and minimizes the possibility of a seal lock-up condition occurring when pressure is applied to the back of the lip seal during periods of fluid pressure relief.

The radial dimensions of the lip seal are also reduced to allow a valve cartridge of given inside diameter to function in a smaller housing bore than that required when a conventional lip seal is used. This facilitates the downsizing of a control valve module in which the valve cartridge is to be used.

This also allows the strengthening ribs to have greater height, and therefore greater strength. Since the annular lip is also allowed to have a greater radial dimension, its fatigue factor is improved. Furthermore, its increased radial dimension of the annular lip proportionally relocates its flex point radially inwardly, which reduces the force required to open the lip seal at the flow paths.

The objects and advantages of the present invention are readily apparent from the following detailed description of the best mode for carrying out the invention when taken in connection with accompanying drawings.

BRIEF DESCRIPTION OF THE DRAWING(S)

A more complete appreciation of the invention and many of the attendant advantages thereof may be readily obtained by reference to the following detailed description when considered with the accompanying drawings in which like reference characters indicate corresponding parts in all the views, wherein:

FIG. 1 is a side elevation, partly in section, of a vehicle antilock braking system control valve as generally shown in U.S. Pat. No. 4,828,335 wherein the lip seal of the present invention finds typical application;

BEST MODE FOR CARRYING OUT THE INVENTION

Figure 2:
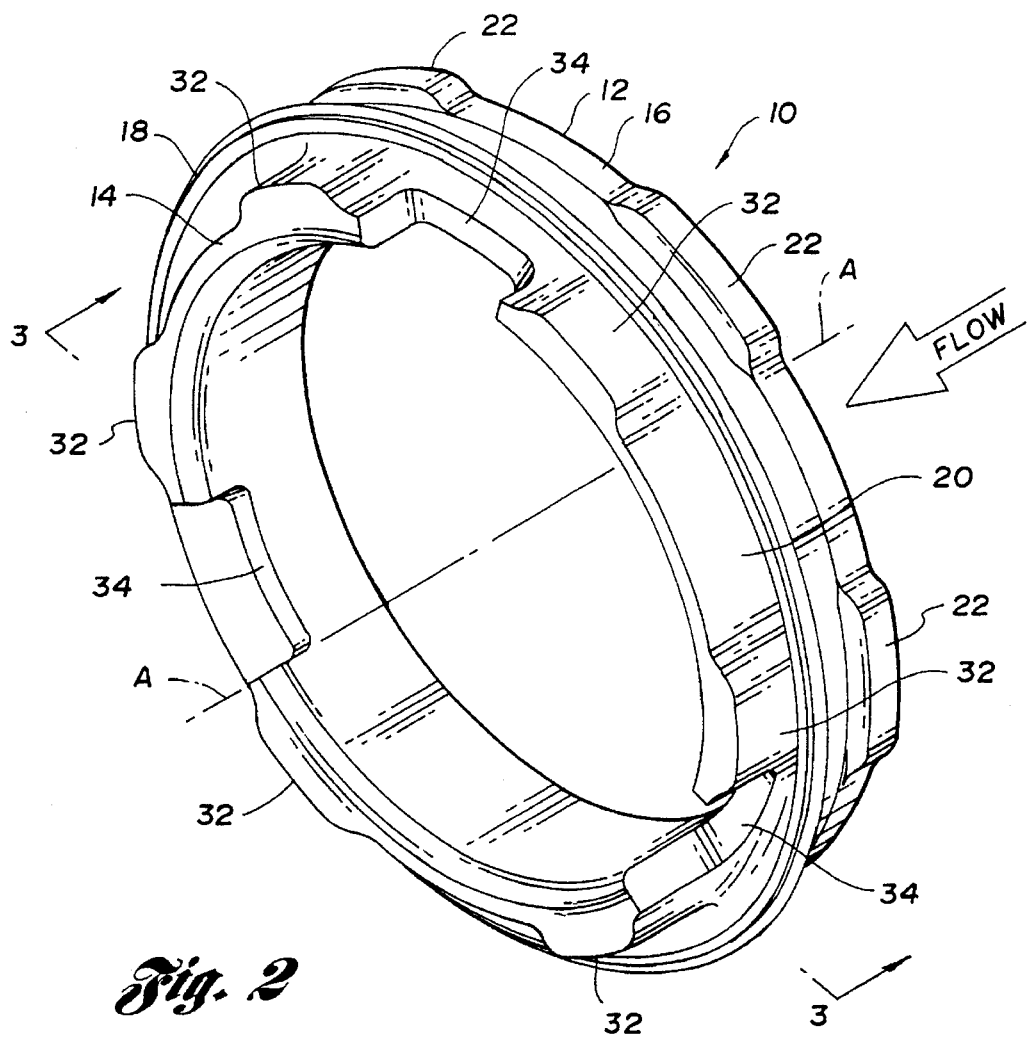
FIG. 2 is a perspective representation of the lip seal of the present invention.

FIG. 2 of the drawing illustrates a first preferred embodiment of the lip seal, generally indicated by reference numeral 10, of the present invention. The lip seal 10 has a first end 12, a second end 14 and a central axis A-A along which it extends. It has a resilient annular body 16 extending coaxially along the central axis A—A from the first end 12 partway toward the second end 14.

A resilient annular seal lip 18 extends from the body 16, flaring outwardly as it extends in the general direction of the second end 14. A resilient annular shoulder 20 extends coaxially along the central axis A—A from the annular body 16 to the second end 14.

Figure 1:
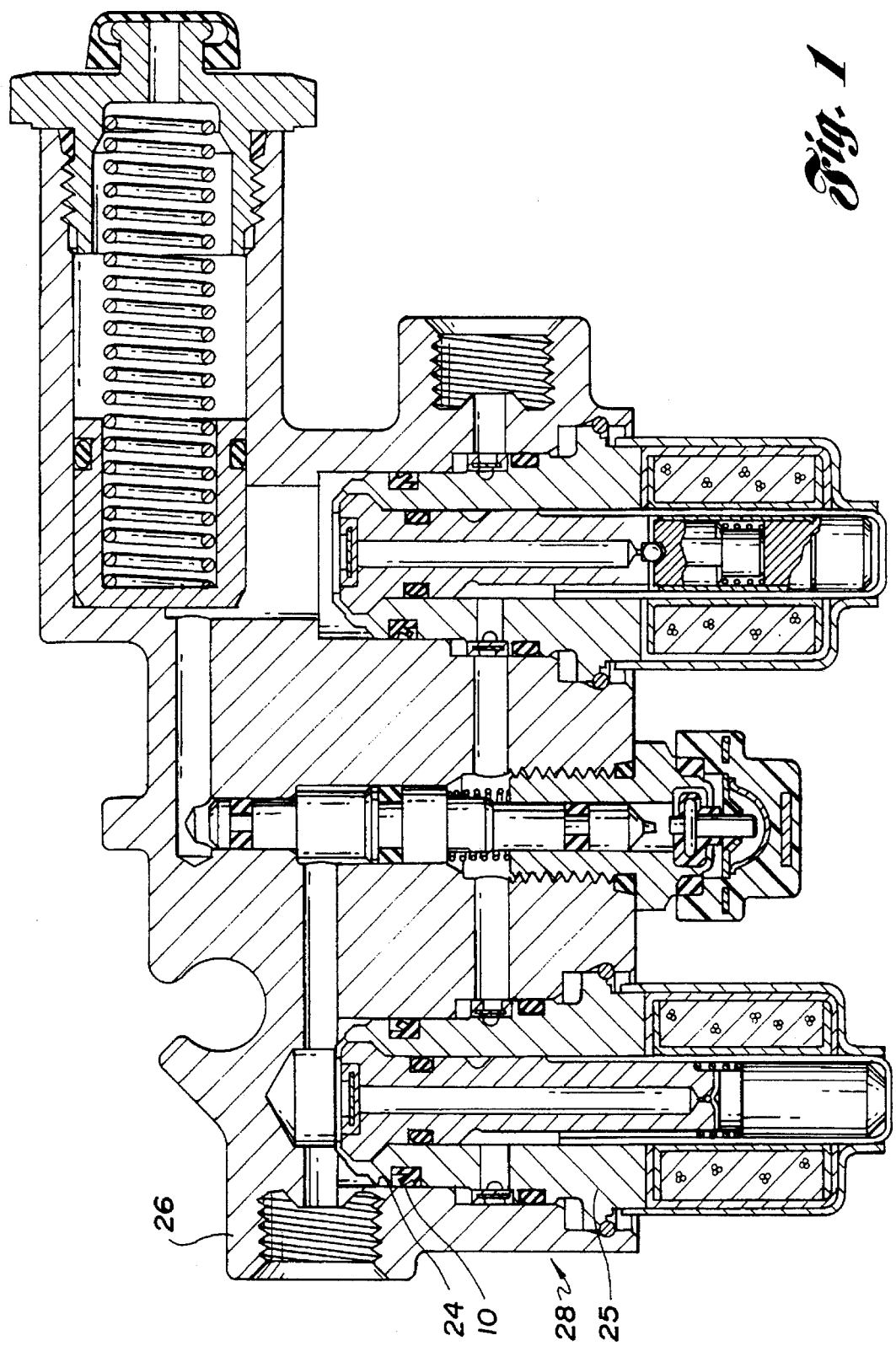

In the first preferred embodiment, six angularly equidistantly spaced resilient flow ribs 22 extend axially along an outer surface of the body 16 proximate the first end 12. The flow ribs 22 are configured to slidably contact an internal bore surface 24 of a valve body 26 of, for example, a control valve, generally indicated by reference numeral 28, illustrated by FIG. 1. The control valve 28 is representative of a valve used in a vehicle antilock braking system (not shown).

Each adjacent pair of the six flow ribs 22 defines a fluid flow path, generally indicated by reference numeral 30, therebetween. The total circumferential dimension of the six flow ribs 22 of the lip seal 10 of the first preferred embodiment approximates a third of the circumference of the internal bore surface 24. These features minimize seal movement during high-velocity fluid releases. The smaller number of flow ribs 22 also defines larger, integrated fluid flow paths 30 than would a larger number of flow ribs 22.

Six angularly equidistantly spaced resilient strengthening ribs 32 extend axially along an outer surface of the shoulder 20 proximate the second end 14. The strengthening ribs 32 provide additional support for, and increase the strength of, the shoulder 20. The strengthening ribs 32 are not only equal in number to but also axially coextend with the flow ribs 22. This coextensive disposition of ribs establishes a columnar strengthening effect, optimizing the strengths of both sets of ribs while minimizing fluid flow restriction in the fluid flow paths 30.

The radial dimensions of the lip seal 10 of the first preferred embodiment are less than those usually found on other seals used for the same purpose. This facilitates the downsizing of a control valve module 28 (FIG. 1) in which a valve cartridge 25 bearing the lip seal 10 is to be used, as explained below. The strengthening ribs 32 are maintained at a height and cross-section to provide strength sufficient to resist compression from the axial flow load. The annular lip 18 is also thus allowed to have a greater radial dimension, which improves its fatigue factor. The increased radial dimension also proportionally relocates the flex point of the annular lip 18 radially inwardly, thus reducing the force required to open the lip seal 10 at the fluid flow paths 30. In addition, this increases the distance between the annular lip 18 and the shoulder 20, thus increasing the amount of deformation the shoulder 20 would have to experience before a lock-up condition would occur. Preferably, the total height of each strengthening rib is substantially equal that of the front end wall 16 intermediate the flow ribs 22, and that portion of annular shoulder 20 intermediate the strengthening ribs will be about one-half the total height of the strengthening rib 32. Thus, the annular shoulder 20 will be quite flexible at a point radially below seal lip 18, thereby facilitating non-uniform deformation of the seal body and consequently the seal lip 18.

Three adjacent and angularly equidistantly spaced pairs of the strengthening ribs 32 define therebetween three corresponding portions of the shoulder 20 that have been undercut, as at 34, from the second end 14 to form a trilobate shoulder. The undercuts 34 promote nonuniform deformation of the annular lip 18 by providing the latter with localized areas into which it can escape, and which will also deform under pressure at the front end wall 16 to a greater extent than those portions of the seal body that include the flow ribs 22 and/or strengthening ribs 32. The direction of deformation would be primarily in the direction of axis A, that is to say, deviating from a plane transverse to axis A.

Figure 3:
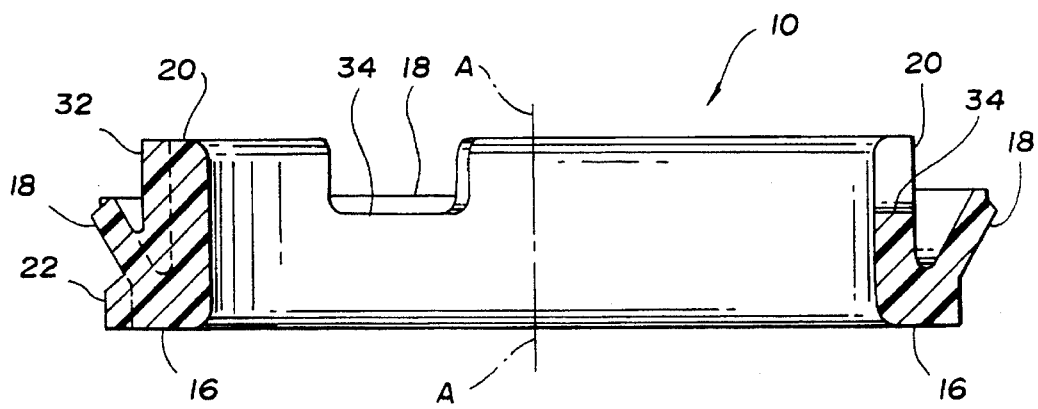
FIG. 3 is a sectional view taken along line 3—3 of the lip seal of FIG. 2.

FIG. 3 is a sectional view taken along line 3—3 of the lip seal 10. The left side of this figure shows details of the annular body 16, the annular lip 18, the shoulder 20, the flow ribs 22 and the strengthening ribs 32 in section. The right side of FIG. 3 shows the annular body 16, the annular lip 18, and the shoulder 20 in section and exposes an undercut 34 of the shoulder 20.

When fluid pressure ahead of the lip seal 10 is greater than that behind it, the resulting pressure differential forces the flaring resilient annular lip 18 against the internal bore surface 24 (FIG. 1), preventing fluid flow therepast. When fluid pressure behind the lip seal 10 sufficiently exceeds that ahead of it, the resilient annular lip 18 yields, allowing fluid to flow through the fluid flow paths defined between the flow ribs 22 and past the resilient annular lip 18. A flow arrow is included in FIG. 2 to indicate the direction of fluid flow along the bore surface 24 of the control valve 28 of FIG. 1.

Figure 4:
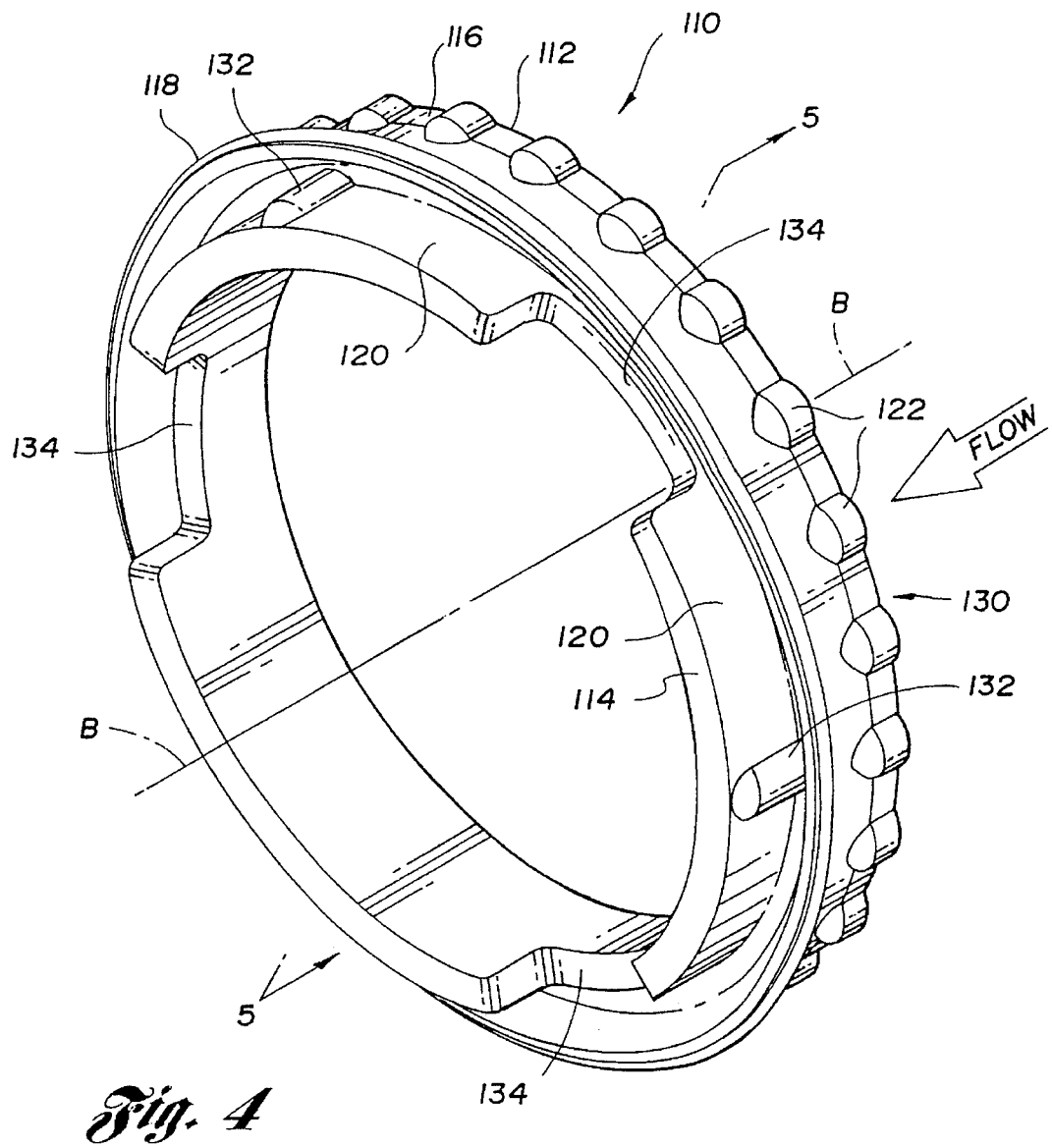
FIG. 4 is a perspective representation of a second embodiment of the lip seal of the present invention.

FIG. 4 of the drawing illustrates a second preferred embodiment of the lip seal, generally indicated by reference numeral 110, of the present invention. The lip seal 110 has a first end 112, a second end 114 and a central axis B—B along which it extends. It has a resilient annular body 116 extending coaxially along the central axis B—B from the first end 112 partway toward the second end 114.

A resilient annular lip 118 extends from the body 116, flaring outwardly as it extends in the general direction of the second end 114. A resilient annular shoulder 120 extends coaxially along the central axis B—B from the annular body 116 to the second end 114.

In the second preferred embodiment, 24 angularly equidistantly spaced resilient flow ribs 122 extend axially along an outer surface of the body 116 proximate the first end 112. The flow ribs 122 are configured to slidably contact an internal bore surface 24 of a valve body 26 of, for example, the control valve, generally indicated by reference numeral 28, illustrated by FIG. 1. The control valve 28 is representative of a valve used in a vehicle antilock braking system (not shown). Each adjacent pair of the 24 flow ribs 122 defines a fluid flow path, generally indicated by reference numeral 130, therebetween.

Three angularly equidistantly spaced resilient strengthening ribs 132 extend axially along an outer surface of the shoulder 120 proximate the second end 114. The strengthening ribs 132 provide additional support for, and increase the strength of, the shoulder 120. The strengthening ribs 132 do not axially coextend with any of the flow ribs 122, as they did in the first embodiment. Rather, each axially coextends with one of the fluid flow paths 130.

The three angularly equidistantly spaced strengthening ribs 132 define therebetween three corresponding portions of the shoulder 120 that have been undercut, as at 134, from the second end 114 to form a trilobate shoulder. As in the first preferred embodiment, the undercuts 134 promote nonuniform deformation of the annular lip 118 by providing the latter with localized areas into which it can escape.

Figure 5:
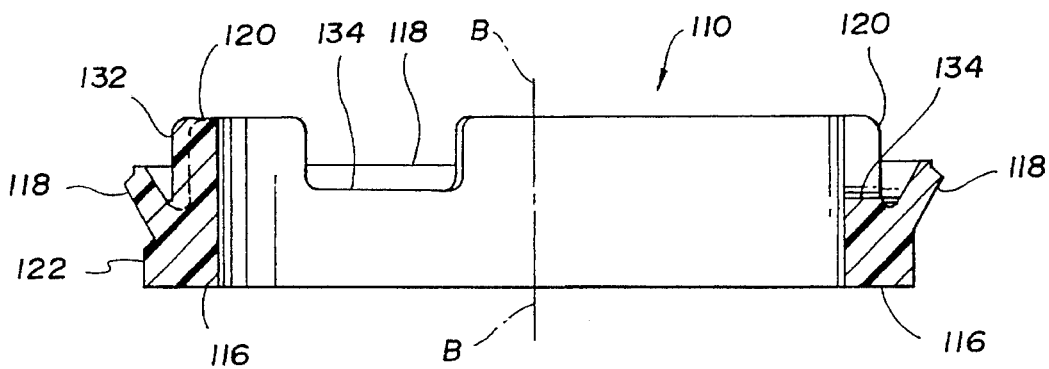
FIG. 5 is a sectional view taken along line 5—5 of the lip seal of FIG. 4.

FIG. 5 is a sectional view taken along line 5—5 of the lip seal 110. The left side of this figure shows details of the annular body 116, the annular lip 118, the shoulder 120, the flow ribs 122 and the strengthening ribs 132 in section. The right side of FIG. 5 shows the annular body 116, the annular lip 118, and the shoulder 120 in section and exposes an undercut 134 of the shoulder 120.

When fluid pressure ahead of the lip seal 110 is greater than that behind it, the resulting pressure differential forces the flaring resilient annular seal lip 118 against the internal bore surface 24 (FIG. 1), preventing fluid from flowing past. When fluid pressure behind the lip seal 110 sufficiently exceeds that ahead of it, the resilient annular lip 118 yields, allowing fluid to flow through the fluid flow paths defined between the flow ribs 122 and past the resilient annular lip 118. A flow arrow is included in FIG. 4 to indicate the direction of fluid flow along the bore surface 24 of the control valve 28 of FIG. 1.

While the best mode for carrying out the invention has been described in detail, those familiar with the art to which this invention relates will recognize various alternative designs and embodiments for practicing the invention as defined by the following claims. For example, while specific reference has been made to U.S. Pat. No. 4,828,335, as representing a vehicle braking environment or system in which the dynamic seals of the subject invention may be utilized, the seal of the present invention may be used in any vehicle braking hydraulic system wherein the same or similar operating conditions require it. Further, while the embodiments illustrated show a specific number of strengthening ribs 32/132 and undercuts 34/134 and flow ribs 22/122, these numbers can be adjusted within a wide permissible range providing that the general approach is maintained of (i) substantially aligning the flow ribs and strengthening ribs to provide a high degree of rigidity the width of the seal from one end 14 to the other end 16 at selected spaced locations about the circumference of the seal, (ii) reducing the radial thickness of the annular seal body at all other locations below the seal lip, (iii) retaining sufficient thickness elsewhere in the seal body to allow required strength to expand the seal over the valve body and into place without breaking, and (iv) providing the annular shoulder with some type of discontinuity such as the undercuts 34, or slits, or other equivalents including the strengthening ribs above without the undercuts, at spaced locations about the circumference of the seal which will provide the desired non-uniform deformation of the seal lip, as described.

What is claimed is:

1. A lip seal having radial dimensions that minimize its cross-sectional area for use in a downsized fluid flow control valve housing, the lip seal having a first end, a second end and a central axis extending between said ends, the lip seal comprising:

a resilient annular body proximate the first end;

a resilient annular lip extending from the body and flaring outward in a direction generally toward the second end;

a resilient annular shoulder extending from the annular body to the second end;

a plurality of resilient flow ribs each extending axially along the cylindrical outer surface of the body proximate the first end to said annular lip to slidably contact an internal bore surface of a valve, each adjacent pair of the plurality of flow ribs defining a fluid flow path therebetween to accommodate flow during fluid pressure relief;

means for promoting nonuniform deformation of the annular lip to provide a fluid flow path past at least one predetermined area of the annular lip during fluid pressure relief and thereby minimize the possibility of a seal lock-up condition occurring;

the means for promoting nonuniform deformation of the annular lip including a plurality of undercut portions provided within said annular shoulder, each undercut portion being open at said second end and forming a trilobate shoulder within said annular shoulder, each said undercut portion extending from the second end of the lip seal toward the juncture of the annular lip with the body thereof and axially inward of the annular lip toward said first end, thereby providing space into which a deforming portion of the annular lip can escape.

2. The lip seal as defined by claim 1, wherein the means for promoting non-uniform deformation of the annular lip further includes a plurality of resilient strengthening ribs each extending axially along the cylindrical outer surface of the shoulder proximate the second end;

said plurality of undercut portions including at least three undercut portions, said undercut portions being substantially equally radially spaced from one another, and each said undercut portion being angularly equidistantly spaced between two adjacent strengthening ribs.

3. The lip seal as defined by claim 2, wherein each of the plurality of strengthening ribs extends axially along the cylindrical outer surface of the shoulder from the line of intersection of the annular lip and the shoulder to the second end of the lip seal.

4. The lip seal as defined by claim 3, wherein each of the plurality of flow ribs extends axially along the cylindrical outer surface of the body from the first end of the lip seal to the line of intersection of the annular lip and the body.

5. The lip seal as defined by claim 4, wherein the plurality of flow ribs comprises six angularly equidistantly spaced flow ribs.

6. The lip seal as defined by claim 3, wherein the plurality of strengthening ribs comprises six angularly equidistantly spaced strengthening ribs.

7. The lip seal as defined by claim 3, wherein each of the plurality of strengthening ribs axially coextends with a flow rib.

8. A lip seal having radial dimensions that minimize its cross-sectional area for use in a downsized fluid flow control valve housing, the lip seal having a first end, a second end and a central axis extending between said ends, the lip seal comprising:

a resilient annular body proximate the first end;

a resilient annular lip extending from the body and flaring outward in a direction generally toward the second end;

a resilient annular shoulder extending from the annular body to the second end;

a plurality of resilient flow ribs each extending axially along the cylindrical outer surface of the body proximate the first end to slidably contact an internal bore surface of a valve, each adjacent pair of the plurality of flow ribs defining a fluid flow path therebetween to accommodate flow during fluid pressure relief;

means for promoting nonuniform deformation of the annular lip to provide a fluid flow path past at least one predetermined area of the annular lip during fluid pressure relief and thereby minimize the possibility of a seal lock-up condition occurring;

the means for promoting nonuniform deformation of the annular lip including a plurality of resilient strengthening ribs each extending axially along an outer surface of the shoulder proximate the second end; and wherein each of the plurality of strengthening ribs extends axially along the cylindrical outer surface of the shoulder from the line of intersection of the annular lip and the shoulder to the second end of the lip seal.

9. The lip seal as defined by claim 8, wherein each of the plurality of strengthening ribs axially coextends with a flow rib.

* * * * *